United States Patent
Niepceron et al.

(10) Patent No.: US 11,149,840 B2
(45) Date of Patent: Oct. 19, 2021

(54) PROCESS FOR THE ASSEMBLY OF AN EPICYCLIC OR PLANETARY GEAR TRAIN

(71) Applicant: SAFRAN TRANSMISSION SYSTEMS, Colombes (FR)

(72) Inventors: Clément Paul René Niepceron, Moissy-Cramayel (FR); Boris Pierre Marcel Morelli, Moissy-Cramayel (FR); Adrien Louis Simon, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 82 days.

(21) Appl. No.: 16/395,663

(22) Filed: Apr. 26, 2019

(65) Prior Publication Data
US 2019/0331211 A1 Oct. 31, 2019

(30) Foreign Application Priority Data
Apr. 26, 2018 (FR) .......................... 1853649

(51) Int. Cl.
| | |
|---|---|
| F16H 57/08 | (2006.01) |
| F02C 7/36 | (2006.01) |
| F16H 1/28 | (2006.01) |
| B23P 15/14 | (2006.01) |
| F16H 57/023 | (2012.01) |
| F02K 3/06 | (2006.01) |

(52) U.S. Cl.
CPC ............ *F16H 57/082* (2013.01); *B23P 15/14* (2013.01); *F02C 7/36* (2013.01); *F16H 1/28* (2013.01); *F16H 57/023* (2013.01); *F02K 3/06* (2013.01); *F05D 2260/40311* (2013.01)

(58) Field of Classification Search
CPC ........ F16H 57/082; F16H 57/023; F16H 1/28; F16H 1/32; F16H 2001/325; B23P 15/14; F02C 7/36; F02K 3/06; F05D 2260/40311
See application file for complete search history.

(56) References Cited

U.S. PATENT DOCUMENTS

| 4,759,229 A | * | 7/1988 | Takahashi ............ F16H 57/082 74/409 |
|---|---|---|---|
| 2010/0056321 A1 | | 3/2010 | Snyder et al. |
| 2013/0251511 A1 | | 9/2013 | Coffin et al. |

FOREIGN PATENT DOCUMENTS

FR     2 914 719 A1    10/2018

OTHER PUBLICATIONS

French Application No. 1853649; Search Report dated Jan. 29, 2019—12 pgs. (relevance found in the citations therein).

* cited by examiner

*Primary Examiner* — Rick K Chang
(74) *Attorney, Agent, or Firm* — Lathrop GPM LLP

(57) ABSTRACT

The invention concerns a process for the assembly of an epicyclic or planetary gear train of a planet gear carrier comprising one or more bores, each of the bores being intended to receive a pivot (18), the process comprising the following steps:
a) manufacturing of at least one pivot (18) comprising a real axis (46) distinct from a theoretical axis;
b) measuring the position of a real axis of each of said one or more bores of the carrier;
c) for each bore of the carrier, mounting a pivot (18) in said bore and orienting it angularly so that the eccentricity of the pivot (18) at least partially makes up for the eccentricity of said bore.

9 Claims, 5 Drawing Sheets

PROCESS FOR THE ASSEMBLY OF AN EPICYCLIC OR PLANETARY GEAR TRAIN

CROSS-REFERENCE TO RELATED APPLICATION

This application claims priority to French Patent Application No. 1853649, filed Apr. 26, 2018, which is incorporated herein by reference.

DOMAIN OF THE INVENTION

This invention concerns a process for the assembly of an epicyclic or planetary gear train intended to equip a turbine engine, such as a turbojet or an aircraft turboprop.

BACKGROUND

A turbine engine may include a gear train connecting its turbine shaft to one or more output elements, such as a blower, for example. This type of gear train includes an inner planet gear (also called sun gear) driven by an input shaft, for example a turbine shaft, an outer planet gear (also called ring gear), coaxial with the sun gear, with planet gears meshing with both the sun and ring gears, and a carrier on which these planet gears are rotatably mounted. The planet gears are mounted in a mobile and rotating manner on pivots that are inserted into the bores of the carrier.

In a particular configuration, the gear train can reduce the speed between an input and an output of the gear train. The variation in the reduction ratio of such a gear train is obtained by modifying the number of teeth of the sun gear, planet gears and ring gear, and by the architecture of the gearbox, i. e. epicyclic or planetary. These two types of gear trains differ from each other in that in the so-called epicyclic gear train, the ring is fixed and the carrier is free to rotate. Conversely, in the so-called planetary gear train, the carrier is stationary and the outer gear or ring gear is free to rotate.

In the case of these two types of gear trains, there is a disparity in the power passing through the planet gears of the carrier. This disparity may result in excessive mechanical stresses applied to some planet gears.

According to the ANSI/AGMA 6123-B06 standard established by the American Gear Manufacturers Association (AGMA), the overload of each planet gear of an epicyclic or planetary gear train must be approximately 12%, under actual operating conditions.

One of the causes of this disparity is the relative positioning error of planet gears, and in particular the relative tangential positioning error of planet gears relative to each other around the carrier axis. In addition, the misalignment of the teeth of planet gears with those of the sun and ring gears leads to premature wear of said teeth, requiring regular maintenance and increasing the operating costs of the turbine engine.

In current technology, one solution to reduce this overload phenomenon is to pair the pivots bearing the planet gears and the bores of the carrier during machining and assembly of the parts. Pairing consists of defining pivot-bore pairs, so that the pivot and the bore of one pair are intended to be assembled together. One consequence of such a pairing is that the pivots of two pairs are not interchangeable.

Pairing makes it more complex to manage parts inventories when assembling or maintaining epicyclic trains. In addition, pairing operations are constraining since they require complex preassembly tasks for the assembly of the carrier components, which leads to high production costs and makes maintenance operations more complex.

One of the main aims of the invention is to reduce planet gear positioning errors in the carrier in a simple, efficient and economical way, by imposing a particular pivot design, and without having to use pairing.

SUMMARY OF THE INVENTION

Firstly, this invention concerns a process for assembling an epicyclic or planetary gear train of a carrier comprising one or more bores, each of the bores being intended to receive a pivot, the process comprising the following steps:

a) manufacturing of at least one pivot comprising a real axis distinct from a theoretical axis;

b) measuring the position of a real axis of each of said one or more bores of the carrier;

c) for each bore of the carrier, mounting a pivot in said bore and rotate it angularly so that the eccentricity of the pivot at least partially compensates for the eccentricity of said bore.

The defects in the location of the bores on the carrier as well as the concentricity defects of the pivots contribute to the tangential offset of the real axis from the theoretical axis. In general, due to tolerances and possible manufacturing defects of the bores, each of these bores has a real axis distinct from the theoretical axis.

Thus, although the individual pivots and bores each have real axes (i.e. actual axes) eccentric with respect to their theoretical axes, assembly according to the process of this invention makes it possible to minimize the axes' eccentricity resulting from the pivot-bore assemblies.

The orientation of the pivot in the carrier during the assembly step c) in such a way that the eccentricity of the pivot at least partially compensates for the eccentricity of the said bore allows the eccentricities of the actual axes of the pivot and the bore to partially compensate for each other.

The orientation of the parts during assembly then makes it possible to correct the relative tangential position defect between the planet gears, and consequently to reduce the phenomenon of overloading of the planet gears, pivots and bores, without modifying the manufacturing tolerances of the carrier bores and the pivots.

Thus, each pivot is compatible with each bore, provided an appropriate angular orientation of the pivot in the bore when mounted.

This process, which does not require pairing, also allows the interchangeability of parts during assembly or maintenance operations. Thus, whatever the pivot mounted in a particular bore and the orientation of the pivot in the bore, the process according to this invention allows the defect resulting from the pivot-bore assembly to be reduced.

Due to the better control of manufacturing the pivots and their raceways, the concentricity defects of the pivots are statistically less important than the defects in the location of the bores on the carrier, so that the defect in the pivots may not, in some cases, be sufficient to compensate for the defect in the positioning of the bores in the carrier.

In order to ensure systematic compensation of at least part of the real axes of the pivot and the bore, the process according to the invention proposes, prior to assembly, a step of manufacturing the pivot with a controlled eccentricity of its real axis.

Step a) of the process according to the invention may thus include:
  manufacturing of at least one pivot comprising:
    at least one raceway the axis of which coincides with the actual axis of the pivot, and
    at least one shrink-fitting seat of the pivot in a bore, the axis of which coincides with the theoretical axis of the pivot.

The eccentricity of the real axis with respect to the theoretical axis is controlled during manufacture according to the invention of a pivot, by modifying the axis of rotation of its raceways, usually confused with the axis of the shrink-fitting seat, in the case of a pivot without any eccentricity defect of its real axis.

Thus, by introducing an eccentricity between the raceways and the shrink-fitting seat of the pivot, a minimum defect of the pivot is ensured, allowing its effective use during the assembly process according to the invention.

Step a) may also include the following steps:
  dividing each of said pivots into n angular sectors $i_1 \ldots i_q \ldots i_n$ extending about the theoretical axis of said pivot;
  defining a vector $\vec{V}$ oriented from the theoretical axis to the real axis, and identifying the angular sector $i_q$ including the vector $-\vec{V}$.

Step c) may also include the following steps:
  i) dividing each of said planet gear carrier bores into k angular sectors $j_1 \ldots j_l \ldots j_k$ extending about the theoretical axis of said bore;
  ii) for each bore, defining a vector $\vec{U}$ oriented from the theoretical axis to the real axis, and identifying the angular sector $j_l$ including the vector $\vec{U}$;
  iii) for each bore of the carrier, mounting a pivot such that for each mounting, the angular sectors identified $j_l$ and $i_q$ are superimposed.

The orientation of the pivot in the carrier during the assembly step iii) so that the identified sectors overlap and therefore the vectors $\vec{U}$ and $\vec{V}$ are not arranged in the same angular sector, allows the eccentricities of the actual axes of the pivot and the bore to partly be made up.

In addition, the carrier can carry first coupling means and the pivots can carry second coupling means, arranged in the $i_q$ area, said second coupling means comprising an opening having a shape suitable for cooperating with said first coupling means. The first and second coupling means are form-fitting coupling means which can be also called shape engagement coupling means.

In addition, according to the invention, the opening can be formed in a radial growth carried by the pivot.

This makes it easy to deduce the angular sectors $i_q$ where the actual axes of the pivots are positioned.

Also according to one characteristic of the invention, the first coupling means may include a first projecting member arranged in the angular sector $j_l$, the first member being capable of being arranged in k bores, each arranged around a bore and in one of the angular sectors $j_1 \ldots j_l \ldots j_k$ and in which step ii) may further include the following step:
  inserting the first organ into the l-ith bore positioned in the angular sector $j_l$.

Therefore, each bore includes a member carried by the planet gear carrier and located in the angular sector $j_l$ comprising the vector $\vec{U}$ and each pivot includes a radial growth E including an opening, capable of cooperating with the member. The radial growth E is located in the angular sector $i_q$ comprising the vector $-\vec{V}$. In this way, the angular sectors $j_l$ and $i_q$ respectively for each of the bores and each of the pivots are visually identified. It is easier to deduce the angular sectors where the actual axes of the bores and pivots are positioned.

Step (iii) may also include the following step:
  orienting the pivot so as to insert the first member carried by the carrier into the opening of the radial growth E carried by the pivot.

Therefore, by mounting the pivot so as to insert the member into the opening of the remaining radial growth $E_q$ of the pivot, it is ensured that the pivot is mounted in the bore by orienting it so as to overlap the identified angular sectors $j_l$ and $i_q$ of the bore and the pivot respectively.

By superimposing the angular sectors $j_l$ and $i_q$, the vectors $\vec{U}$ and $\vec{V}$ are not arranged in the same angular sector, which means that the position error of the real axes of the pivot and the bore make up for each other, at least in part.

Moreover, the cooperation of the member and the opening of the radial growth $E_q$ reduces orientation errors when mounting the pivot in the bore.

This process is an industrially viable solution, which also avoids pairing the bores of a planet gear carrier and the associated pivots.

The pivots and bores are respectively divided into n and k angular sectors such that n can be greater than or equal to k.

Thus, when n is strictly higher than k, the position of the real axis is more precisely identified on the pivot while avoiding cutting the bore into as many angular sectors. As mentioned above, each of the angular sectors of the bores includes holes arranged around the periphery of the bores on the planet gear carrier. Such large numbers of holes on the carrier can contribute to its mechanical weakening. Therefore, by limiting the number of angular sectors k such that n is greater than k, the mechanical weakening of the planet gear carrier resulting from the formation of holes is reduced and better controlled.

For this purpose, n and k can be between 3 and 8, including terminals.

The invention also concerns an epicyclic or planetary gear train that can be obtained by the process as described above.

In addition, the invention concerns an epicyclic gear train comprising one or more bores, each of the bores receiving a pivot comprising a real axis distinct from a theoretical axis, said pivot being angularly oriented so that the eccentricity of the pivot at least partly makes up for the eccentricity of said bore.

Such an epicyclic gear train thus has minimal eccentricities of the axes resulting from the pivot-bore assemblies. By orienting the pivots in the bores of the epicyclic gear train, the latter has a lower overload of the planet gears of the pivots and bores, without modifying the manufacturing tolerances of the carrier bores and the pivots.

In addition, the assembly of such a gear train does not require pairing, thus allowing interchangeability of parts during assembly or maintenance operations. Thus, whatever the pivot mounted in a particular bore and the orientation of the pivot in the bore, the process according to this invention allows the defect resulting from the pivot-bore set to be reduced.

According to one characteristic of the invention, the pivot of the epicyclic gear train may include:
  at least one raceway the axis of which coincides with the actual axis of the pivot, and at least one shrink-fitting seat of the pivot in a bore, the axis of which coincides with the theoretical axis of the pivot.

The pivots used during assembly are manufactured by ensuring a controlled eccentricity of the actual axis with respect to the theoretical axis.

In addition, the bores and pivots may respectively include first and second coupling means capable of cooperating together to maintain the pivot in a predetermined orientation in the bore, said second coupling means comprising an opening having a shape capable of receiving said first coupling means.

For example, the first coupling means may include a projecting member.

Also, the opening can be formed in a radial growth carried by the pivot, and may be suitable for receiving said projecting member.

The coupling means of the bores and pivots can be respectively arranged in an angular sector comprising a vector $\vec{U}$ oriented from a theoretical axis to a real axis and in an angular sector comprising a vector $\vec{V}$, the vector $\vec{V}$ being oriented from a theoretical axis to a real axis.

The invention also concerns an epicyclic or planetary gear train that can be obtained by the process as described above.

In addition, such a gear train may include one or more bores, each of the bores receiving a pivot comprising a real axis distinct from a theoretical axis, said pivot being oriented angularly so that the eccentricity of the pivot at least partially makes up for the eccentricity of said bore.

In particular, the pivot can include:
at least one raceway the axis of which coincides with the actual axis of the pivot, and
at least one shrink-fitting seat of the pivot in a bore, the axis of which coincides with the theoretical axis of the pivot.

The epicyclic gear train may comprise a planet gear carrier having bores in which pivots are arranged, the bores and pivots being able to comprise respectively first and second coupling means able to cooperate together in order to maintain the pivot in a predetermined orientation in the bore, said second coupling means being able to comprise an opening having a shape suitable for receiving said first coupling means.

In addition, the first coupling means may include a projecting member.

Also, the opening can be formed in a radial growth E carried by the pivot and may be suitable for receiving said projecting member.

According to another characteristic of the invention, said bore and pivot coupling means can be respectively arranged in an angular sector comprising a vector $\vec{U}$ oriented from a theoretical axis to a real axis and in an angular sector comprising a vector $-\vec{V}$, the vector $\vec{V}$ being oriented from a theoretical axis to a real axis.

The invention will be better understood and other details, characteristics and advantages of the invention will appear when reading the following description, which is given as a non-limiting example, with reference to the attached drawings.

DETAILED DESCRIPTION

Figure 1:
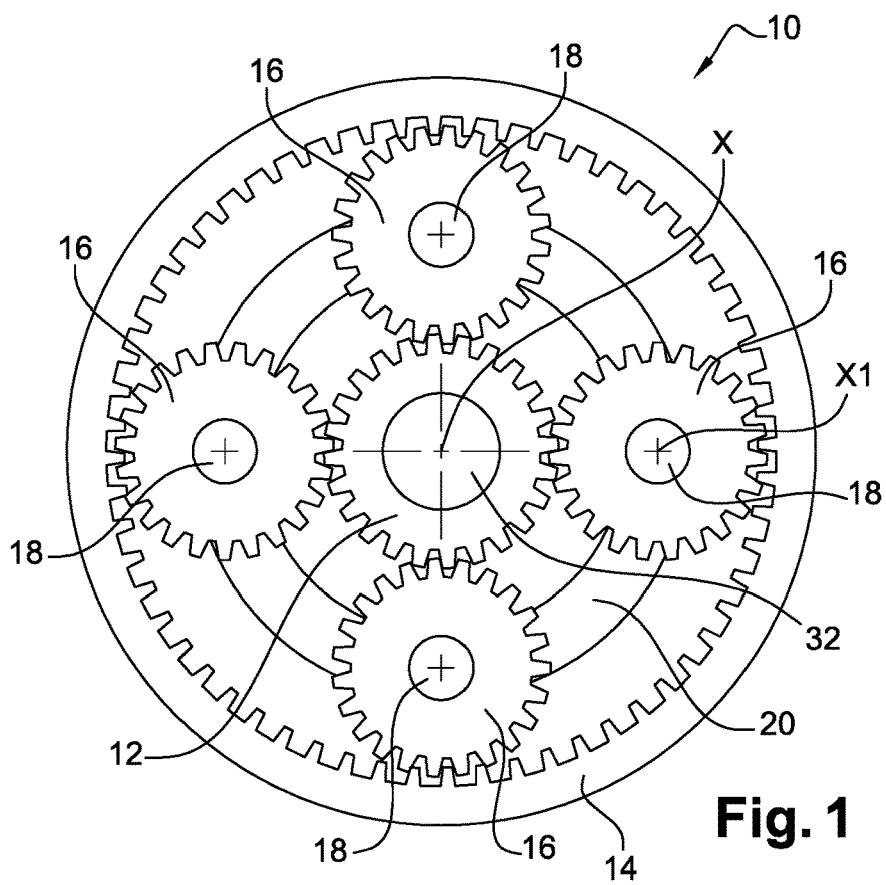
FIG. 1 is a schematic front view of a gear train, axially from upstream.

FIG. 1 schematically illustrates the structure of an epicyclic or planetary gear train 10. This type of gear train 10 typically includes an inner gear 12 (also called central pinion, sun or solar gear) and an outer gear 14 (also called ring gear), these two gears being coaxial. The sun gear 12 can be rotated about its X axis, the ring gear 14 can be fixed, or rotatively coupled to a propeller as in the case of a turboprop or blower impeller wheel as in the case of a double flow turbojet. The gear train 10 further comprises planet gears 16 rotatively mounted on pivots 18 of a planet gear carrier 20. Each planet gear 16 meshes with both the sun gear 12 and ring gear 14. The planet gear carrier 20 is fixed or able to pivot about the axis X of the sun gear 12 and the ring gear 14. The inlet may be formed by the sun gear 12 and the outlet by the planet gear carrier 20.

In another example, the carrier 20 can be fixed or rotatably coupled to a propeller of a turboprop or a blower impeller wheel of a dual-flow turbojet engine.

Figure 2:
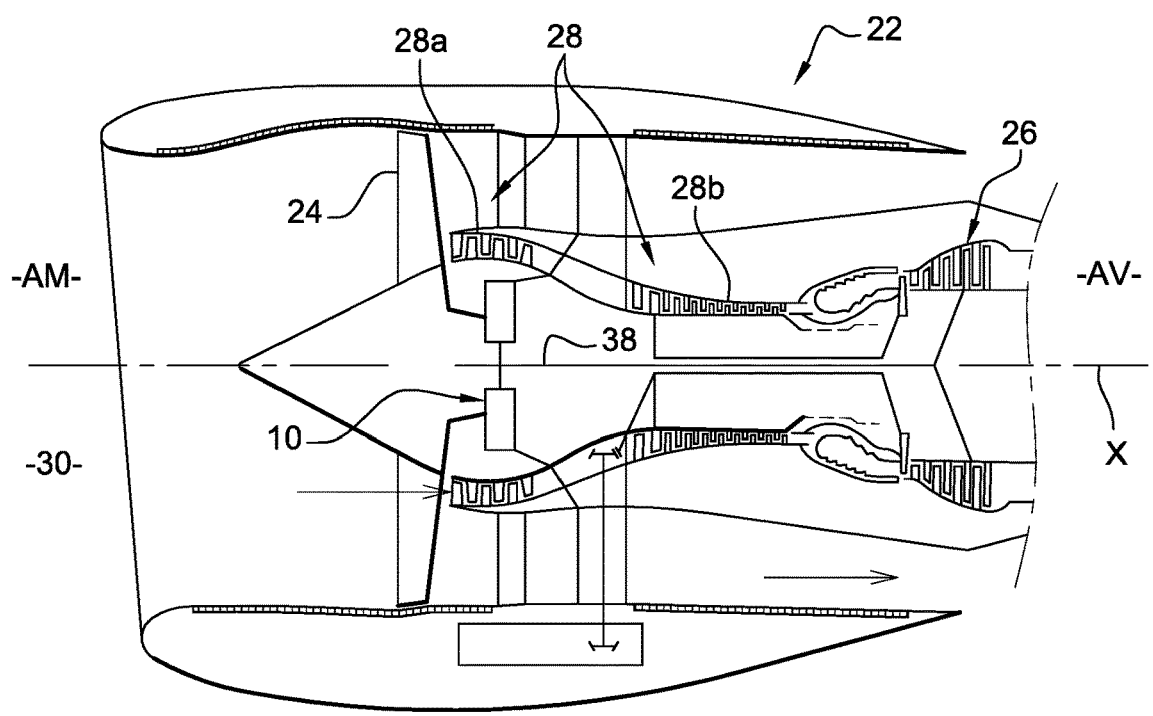
FIG. 2 is a schematic representation of a turbine engine.

FIG. 2 schematically illustrates an aircraft turbine engine 22 in which gear trains 10 are used as speed reducers to reduce the rotational speed of a rotor, such as a blower impeller 24, regardless of the rotational speed of at least one turbine 26 coupled axially downstream to at least one compressor 28 with which the turbine engine is also equipped. Starting from the front air inlet 30, then blower impeller 24 and compressor 28 are passed through by air.

The central pinion, or sun gear 12, surrounds and is then fixed in rotation to the shaft 32 of the compressor 28 as illustrated for example by FIGS. 1 and 2. In particular, the gear train 10 can be mounted in a radially formed annular chamber inside a low-pressure compressor 28a arranged downstream of the blower impeller wheel 24 and upstream of a high-pressure compressor 28b as shown in FIG. 2.

As can be seen from FIG. 1, the alignment of the planet gears with the sun gear 12 and ring gear 14 is necessary for the proper operation of gear train 10 and to limit maintenance operations.

Figure 3:
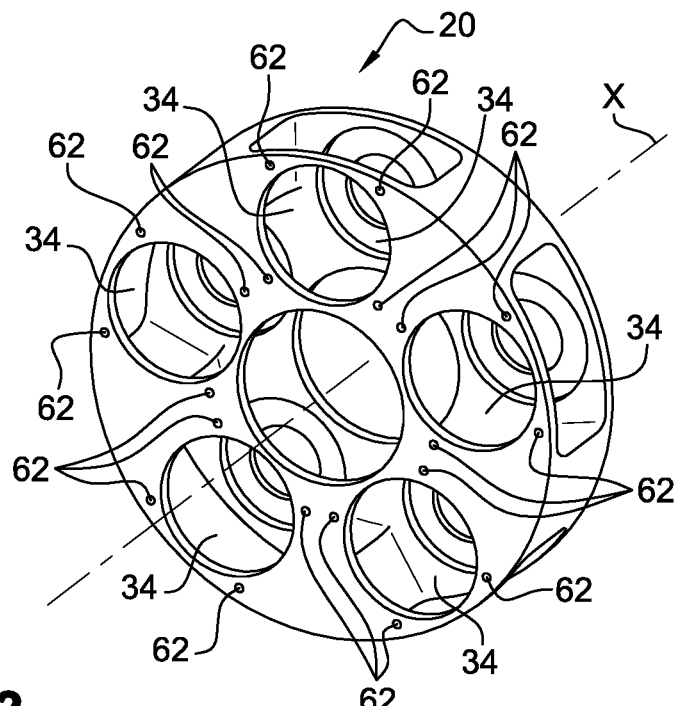
FIG. 3 is a schematic view of a planet gear carrier according to the invention.

Incorrect positioning of planet gears 16 in the holes 34 of the carrier 20, visible in FIG. 3, results in misalignment of the teeth of planet gears 16 with the teeth of the sun gear 12 and the teeth of the ring gear 14. This results in a disparity in the power passing through the planet gears 16 leading to early wear and tear of the teeth.

It is therefore necessary to provide a solution to reduce the misalignment of planet gears 16 as much as possible when assembling such gear trains 10.

Figure 7A:
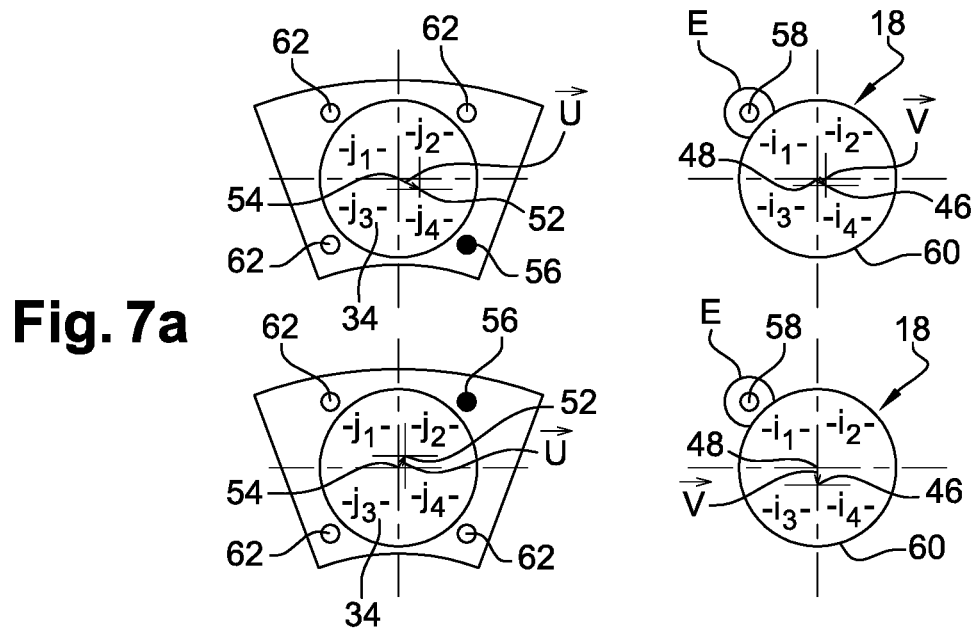
FIGS. 7a and 7b respectively illustrate assembly step c) of the process according to the invention.
Figure 7B:
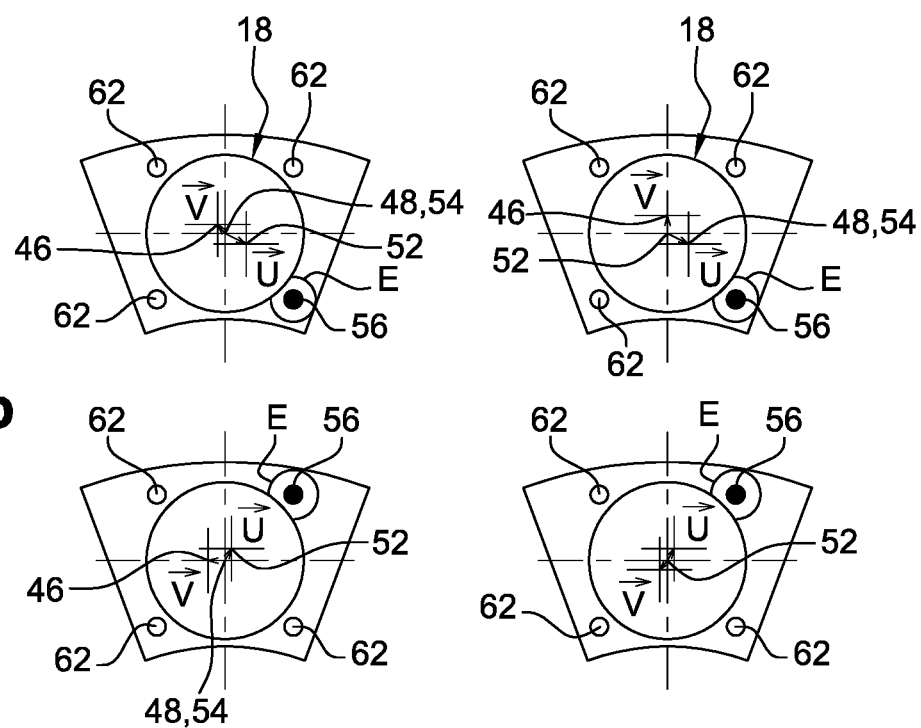

For this purpose, as partially illustrated in FIGS. 7a and 7b, an assembly process for gear trains 10 is proposed. Mounting can be carried out from at least one pivot manufactured according to a step of the assembly process and a carrier 20 comprising one or more bores 34.

FIG. 3 illustrates an example of a planet gear carrier 20 according to the invention, from which an epicyclic train is assembled. It has five bores 34 regularly distributed around the X axis and dimensioned so that a pivot 18 can be mounted therein.

Figure 4:
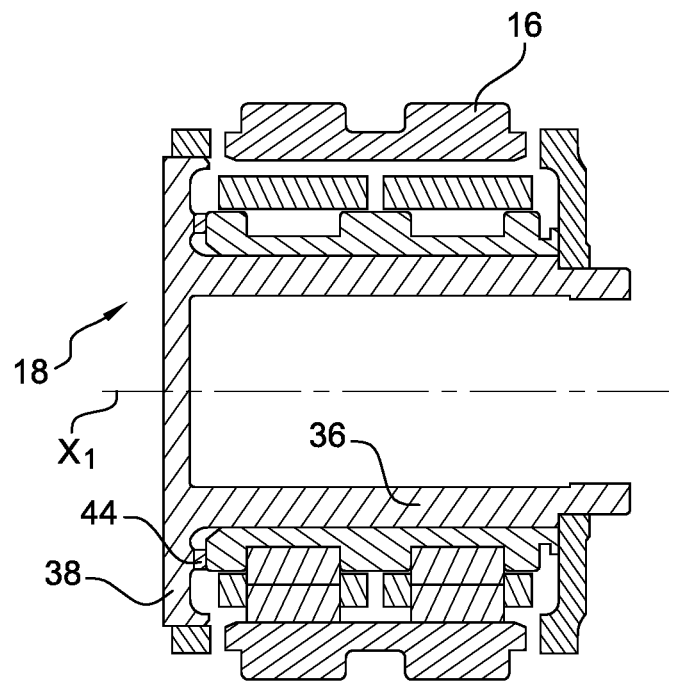
FIG. 4 is a cross-sectional view of a pivot mounted in a bore of a planet gear carrier.
Figure 5:
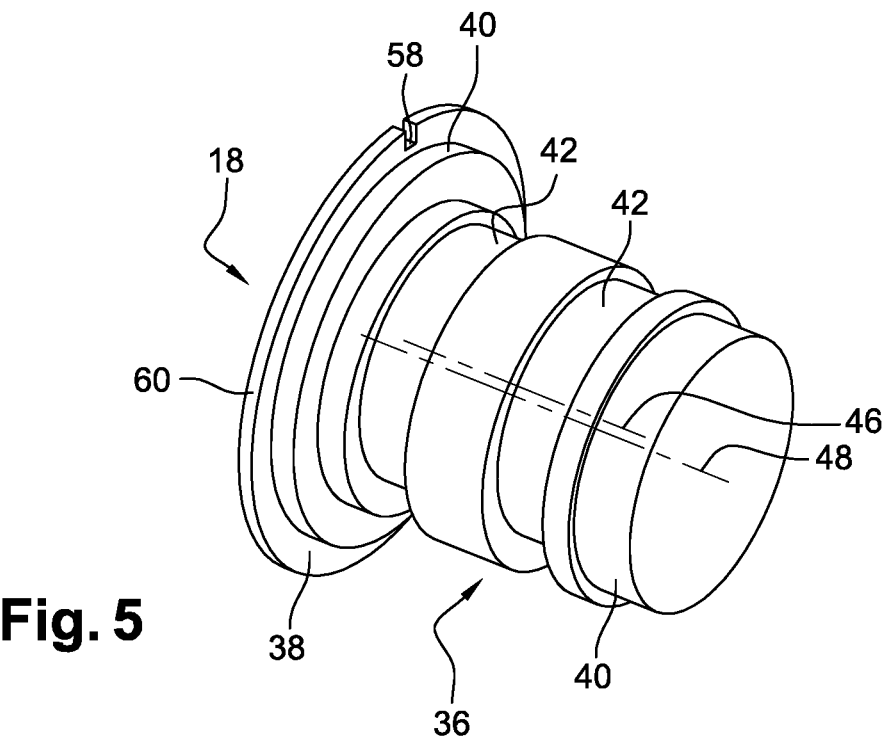
FIG. 5 is a perspective view of a pivot manufactured according to the invention.

An example of a pivot manufactured according to the invention is shown in FIG. 5. Pivot 18 comprises an axis 36, the diameter of which is dimensioned in such a way that it can be arranged in the bores 34 of the planet gear carrier 20. Axis 36 is generally cylindrical or frustoconical, one end of which is extended by an annular linking part 38 extending radially outwards (FIG. 4).

Pivot 18 also includes a shrink-fitting seat 40 in a bore 34. Since pivot 18 is intended to be shrunk at these shrink-fitting seats 40 in one of the bores 34 of the carrier 20, the shrink-fitting seats 40 of pivot 18 in bore 34 correspond to an annular surface of axis 36 of pivot 18, said seats being intended to be in close contact with at least part of the bore 34 of the carrier 20. Thus, as shown in FIG. 4, when the pivot 18 is mounted in a bore 34 of the carrier 20, the shrink-fitting seats 40 of the pivot 18 are in contact over their entire surface with part of the inner annular surface of the bore 34.

Pivot 18 also includes raceways 42 to receive a bearing to rotate planet gears 16 (visible in FIG. 1) that mesh simultaneously with the sun gear 12 and the ring gear 14 as described in FIG. 1.

The mounting of a pivot 18 in a bore is also visible in FIG. 4. Axis 36 of pivot 18 is arranged inside the bore 34 of the carrier 20 so that the connecting part 38 rests on the surface 44 of the carrier 20 on the periphery of bore 34.

In the example shown in FIGS. 7a and 7b, the process is applied to two bores 34, of the same or two separate carriers 20, and to two pins 18, manufactured according to a first step of the assembly process.

The first step of the process includes a step of manufacturing at least one pivot 18 comprising a real axis 46 distinct from a theoretical axis 48. An example of pivot 18 obtained by this first process step is shown in FIGS. 5 and 6.

When a pivot 18 is free of defects, i.e. its actual axis 46 and its theoretical axis 48 are confused, this means that the shrink-fitting seats 40 and the raceways 42 are coaxial, with the theoretical axis 48 of the pivot 18 as the real axis. Thus, the manufacturing step, aimed at manufacturing a pivot 18 with a controlled defect, aims at manufacturing a pivot 18 of which at least one raceway 42 and at least one shrink-fitting seat 40 of the pivot 18 in bore 34 are not coaxial.

In particular, pivot 18 is manufactured so that it includes at least one shrink-fitting seat 40 of pivot 18 in a bore 34, the rotation axis of which coincides with the theoretical axis 48 of pivot 18. In addition, at the same time, pivot 18 is manufactured in such a way that it includes at least one raceway 42 the rotation axes of which coincides with the actual axis 46 of pivot 18.

Figure 6:
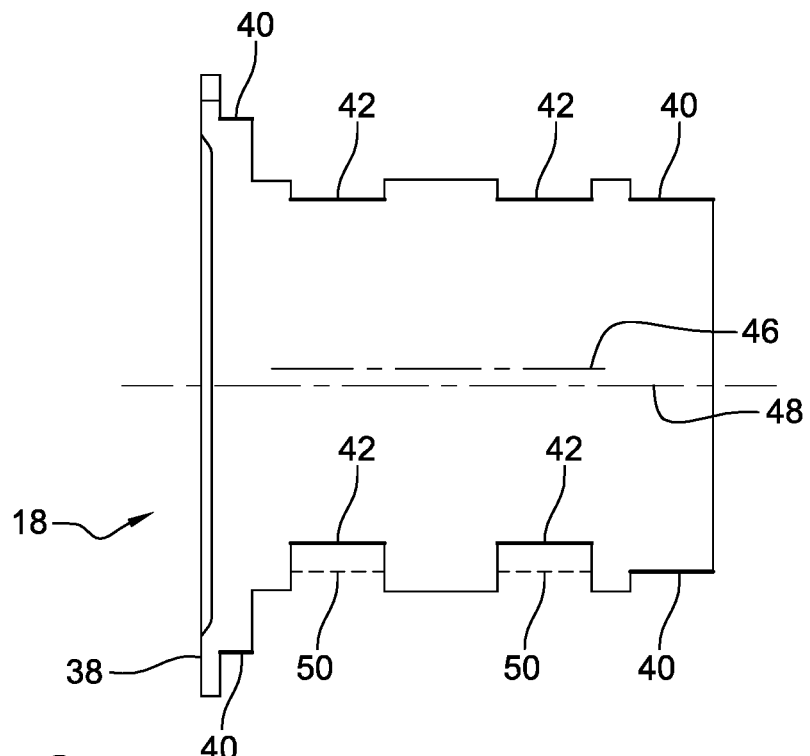
FIG. 6 is a diagram illustrating a cross-sectional view of a pivot manufactured by the process according to the invention.

FIG. 6 shows an example of pivot 18 obtained by the first process step according to the invention. The actual axis 46, corresponding to the rotation axis of the two raceways 42, is eccentric relative to the theoretical axis 48, corresponding to the rotation axis of the two shrink-fitting seats 40 of the pivot 18 in bore 34. The dotted lines 50 correspond to the position that the raceway 42 of the flawless pivot 18, the rotation axis of which coincides with the theoretical axis 48 of the pivot 18, and the rotation axis of the shrink-fitting seats 40 of the pivot 18 in the bore 34 of the carrier 20, should have.

Thus to shift the rotation axis of the raceways 42, when machining the pivot 18, for example by turning, the axis along which the part is rotated to remove the material to form the raceways 42 and the shrink-fitting seats 40, is shifted when machining the raceways 42 with respect to the machining axis of the shrink-fitting seats 40.

Thus, when machining the part, the offset of the axis on which the part is rotated makes it possible to control and know the positioning of the actual axis 46.

The manufacturing step also includes a first step of characterizing the relative known position of the real axis 46 of the manufactured pivot 18 with respect to its theoretical axis 48. This position is characterized by vector $\vec{V}$, oriented from the theoretical axis 48 of the manufactured pivot 18 to the real axis 46, as shown in FIGS. 7a and 7b.

For each pivot 18 manufactured, a vector $\vec{V}$ is defined. The vector $\vec{V}$ is oriented from the theoretical axis 48 to the real axis 46 of the manufactured pivot 18 and its standard is equal to the distance between the theoretical axis 48 and the real axis 46 of the manufactured pivot 18. In other words, the vector $\vec{V}$ corresponds to the translation of the axis in which pivot 18 is rotated when machining raceways 42, compared to the one used when machining shrink-fitting seats 40.

In a practical embodiment, compatible with the industrialization of the parts, the manufacturing step also includes a step consisting in regularly dividing each of the pivots 18 manufactured into several identical angular sectors around their respective theoretical axis 48. Thus, each pivot 18 is divided into n angular sectors $i_1 \ldots i_q \ldots i_n$ extending around the theoretical axis 48 of the pivot 18 considered.

This division into angular sectors makes it possible to locate in which angular sector of the part are located the vector $\vec{V}$, and therefore the real axis 46 of the manufactured pivot 18. In particular, another step in the manufacturing process aims to identify the angular sector $i_q$ comprising the vector $-\vec{V}$.

The second step of the assembly process is to measure the position of a real axis 52 of each of the bores 34 of the carrier(s) 20. The bores thus each have a real axis 52 distinct from the theoretical axis 54. As shown in FIG. 7a, the measurement, in this first step, provides the position of the real axis 52 with respect to the theoretical axis 54 of each of the bores 34.

The eccentricity of the real axis 52 with respect to the theoretical axis 54 of the bores 34 is partly due to manufacturing defects, in particular the position of the bores 34 in the carrier 20.

The three-dimensional position measurement of the real axes 52 of the bores 34 is carried out using a dedicated machine. This machine allows, by palpating the circumference of each bore 34, to determine, by calculation, the actual position of the centre and therefore the real axis 52 of bore 34.

Once the positions of the real axes 52 of the manufactured pivots 18 and the bores 34 of the carrier(s) 20 are known, the third step of the assembly process aims to, for each bore 34 of the carrier 20, mount one of the manufactured pivots 18 in bore 34 and orient it angularly so that the eccentricity of the pivot 18 at least partially makes up for the eccentricity of said bore 34. Eccentricity refers to the eccentricity of the real axes 46, 52 with respect to the theoretical axes 48, 54 of the manufactured pivots 18 and the bores 34.

To allow making up for these eccentricities of the pivot 18 and the bore 34 receiving the pivot 18, the third step of the assembly process includes a first step of characterizing the relative known position of the real axis 52 of the bore 34 with respect to its theoretical axis 54. This position is characterized by vector $\vec{U}$, oriented from the theoretical axis 54 of bore 34 to the real axis 52, as shown in FIGS. 7a and 7b.

For each bore 34, a vector $\vec{U}$ is defined. The vector $\vec{U}$ is oriented from the theoretical axis 54 to the real axis 52 and its standard is equal to the distance between the theoretical axis 54 and the real axis 52 of bore 34.

In a practical embodiment, compatible with the industrialization of the parts, the process includes a second step consisting in dividing, regularly and independently of the division of the manufactured pivots 18, the bores 34 of the carrier 20 into several equal angular sectors around their theoretical axes 54. Thus, bores 34 are independently divided into regular k angular sectors $j_1 \ldots j_l \ldots j_k$ extending around their theoretical axes 54.

Consequently, the manufactured pivots 18 and the bores 34, are respectively divided into n and k sectors, where n and k can be equal, as illustrated in FIGS. 7a and 7b where n=k=4.

This division of bore 34 into angular sectors makes it possible to locate in which angular sector of the part the vector $\vec{U}$, and therefore the real axis 52 of bore 34, are located. In particular, a step in the manufacturing process aims to identify the angular sector $j_l$ comprising the vector $\vec{U}$.

On this basis, the third step of the assembly process includes an additional step illustrated in FIG. 7b which aims to mount one of the manufactured pivots 18 in bore 34 and to orient it angularly in it such that for each assembly the identified angular sectors $j_l$ and $i_q$ are superimposed. In other words, the manufactured pivot 18 is mounted and oriented in one of the bores 34 so that the real axis 46 of the pivot 18 and the real axis 52 of the bore 34 of the assembly, defined by vectors $\vec{U}$ and $\vec{V}$ make up for each other, at least partially.

As shown in FIG. 7b, the pivots 18 can be mounted in either of bores 34. However, during assembly, pivot 18 is mounted in such a way that vectors $\vec{U}$ are $\vec{V}$ not in the same angular sector, i.e. so that the identified angular sectors $j_l$ and $i_q$ are superimposed.

This process does not require pairing of parts, so that pivots 18 can be mounted in all bores 34 provided that the orientation of pivot 18 is respected.

In practice, the third step of the assembly process is carried out by means of a positioning device. The positioning device includes additional coupling means on the pivots 18 and on the carrier 20. The positioning device allows the pivot 18 to be oriented and fixed in the desired orientation during assembly. In practice, it will be understood hereinafter that the device performs mistake proofing when mounting a pivot 18 in a bore 34, avoiding an inappropriate mounting of a pivot 18 in a bore 34 that would lead to the opposite of the desired result, i. e. an increase in teeth misalignments.

As shown in FIGS. 7a and 7b, the coupling means include first form-fitting coupling means carried by the carrier 20. These first coupling means include a first member 56 capable of being placed in a projecting position in holes 62 arranged around the periphery of bores 34. In particular, holes 62 are arranged so that there is only one hole 62 per angular sector for each of the bores 34 of the carrier 20 as shown in FIG. 3.

For each of the bores 34, once the angular sector $j_l$ has been identified, the first member 56 is placed in the hole 62 positioned in the angular sector $j_l$ comprising vector $\vec{U}$ and the real axis 52.

This step therefore makes it possible, for each bore 34, the angular sector where the real axis 52 of bore 34 is located to be visualized unambiguously, and to have a coupling means available there which will then help to "orient" one of the manufactured pivots 18 in bore 34, i.e. in an angular position leading to a reduction in teeth misalignment. In FIG. 7b, which partially illustrates this step, pins 56 are arranged in the angular sectors j2 and j4 comprising vector $\vec{U}$ of these two bores 34.

As shown in FIGS. 5, 7a and 7b, the coupling means also include second form-fitting coupling means carried by pivots 18 having a shape suitable for cooperating with the first form-fitting coupling means. The first and second form-fitting coupling means could be also called first and second shape engagement coupling means. For example, the second form-fitting coupling means includes an opening 58, so that the first member 56, for example a pin 56 carried by the carrier 20, can be arranged inside this opening 58. In particular, as illustrated in FIG. 5, each pivot has an opening 58 arranged around the circumference 60 of pivot 18. In the example of FIGS. 7a and 7b, the openings of the two pivots 18 are formed in a radial growth E of the circumference of the pivots 18 which is arranged at the periphery of the linking part 38 of the pivot 18.

The second coupling means are designed during the manufacturing step of pivot 18. In particular, the opening 58 or the radial growth E including the opening 58 is machined, during the manufacture of the pivot 18, so as to be arranged in the angular sector $i_q$ comprising vector $-\vec{V}$. This allows each pivot 18 to visually identify the angular sector located in the opposite direction of the angular sector in which the real axis 46 of pivot 18 is located, and to provide a coupling means that will then facilitate the "oriented" mounting of pivot 18 in bore 34. At the end of the manufacture of pivots 18, each of the pivots 18 has a single opening 58 or a single radial growth E including opening 58 as shown in FIGS. 5 and 7a.

Therefore, the opening 58 or the radial growth E including the opening 58 of the manufactured pivot 18 constitutes a mistake proofing mean when mounting the opening of the radial growth E in said member of sector $j_l$.

As illustrated in FIG. 7b, the pins 56 carried by the carriers 20, and the 58 opening carried by the pivot 18, make it possible to identify, directly or indirectly, the position and orientation of vectors $\vec{U}$ and $\vec{V}$.

The third step thus also includes, in a practical embodiment of the process, a step consisting, when mounting the pivot in one of the bores, in orienting the pivot 18 so as to insert the first projecting member 56 carried by the carrier 20 into the opening 58 of the radial growth E carried by the pivot 18. As shown in FIG. 7b, pivot 18 is oriented in bore 34 so that pin 56 of bore 34 cooperates with the opening 58 of the radial growth E of pivot 18 to ensure that the real axis 46 of pivot 18 and the real axis 52 of bore 34 are not located in the same angular sector.

By superimposing the visually identified angular sectors $j_l$ and $i_q$ on each of the bores 34 and pivots 18, it is ensured that during assembly, $\vec{U}$ and $\vec{V}$ are arranged in such a way that the real axis 46 of the pivot 18 and the real axis 52 of the bore 34 of the assembly make up for each other, at least partially.

Figure 8:
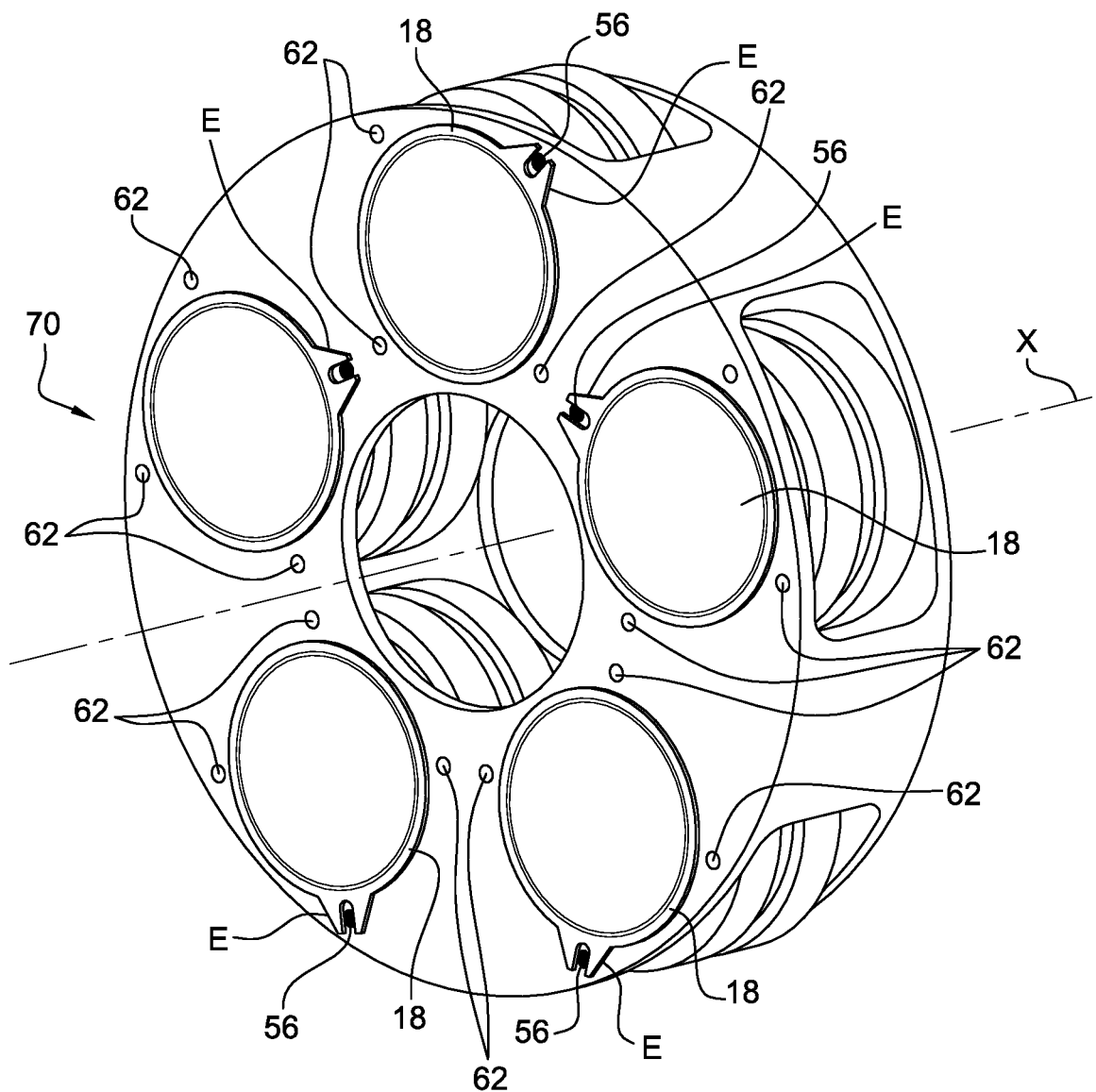
FIG. 8 is a schematic view of a gear train that can be obtained by the process according to the invention.

As shown in FIG. 8, the process produces an epicyclic train gear 70, in which the pivots 18 are oriented in bores 34, using the cooperation between openings 58 of the radial growth E of pivots 18 and the pins 56 arranged around the bores 34.

As shown in FIG. 7b, pivots 18 are interchangeable: they can be mounted in both bores 34, provided that pivots 18 are correctly oriented using their radial growth E.

In the particular case where, for a bore, vector $\vec{U}$ is positioned on the boundary between two angular sectors, one of the two sectors is randomly selected as the sector comprising vector $\vec{U}$. Similarly, for a pivot, when vector $-\vec{V}$ is positioned on the boundary between two angular sectors, one of the two sectors is randomly selected as the sector containing vector $-\vec{V}$. According to one embodiment of the invention, pivots 18 and bores 34 are divided respectively into n and k angular sectors such that n may be greater than or equal to k.

According to another embodiment, n and k can be between 3 and 8, including terminals.

In particular, by limiting the number of angular sectors of bores 34, the number of holes 62 on the periphery of bores 34 on the carriers is also limited. This makes it possible to limit and control the weakening of the carrier 20 by the holes 62.

The invention claimed is:

1. A process for assembling a gear train (70) of a planet gear carrier (20) comprising one or more bores (34), each of the bores (34) being intended to receive a pivot (18), the process comprising the following steps, for each bore (34) of the carrier (20):
    a) manufacturing the pivot (18) by controlling a rotation axis so the pivot (18) comprises a real axis (46) at a known position distinct from a theoretical axis (48);
    b) measuring a position of a real axis (52) of said bores (34) of the carrier (20);
    c) mounting the pivot (18) in said bores (34) and angularly orienting it so that an eccentricity of the pivot (18) at least partially makes up for the eccentricity of said bore (34).

2. The assembly process according to claim 1, wherein step a) includes the following:
    the manufacturing of the pivot (18) comprising:
        at least one raceway (42), the axis of which coincides with the real axis (46) of the pivot (18), and
        at least one shrink-fitting seat (40) of the pivot (18) in a bore (34), the axis of which coincides with the theoretical axis (48) of the pivot (18).

3. The process according to claim 1, wherein step a) also includes the following steps:
    dividing each of said pivots (18) into n angular sectors $i_1 \ldots i_q \ldots i_n$ extending about the theoretical axis (48) of said pivot (18);
    defining a vector $\vec{V}$ oriented from the theoretical axis (48) to the real axis (46), and identifying the angular sector $i_q$ comprising vector $-\vec{V}$.

4. The process according to claim 3, wherein step c) comprises the following steps:
    i) dividing each of said bores (34) of the carrier (20) into k angular sectors $j_1 \ldots j_l \ldots j_k$ extending about the theoretical axis (54) of said bore;
    ii) for each bore, defining a vector $\vec{U}$ oriented from the theoretical axis (54) to the real axis (52), and identifying the angular sector $j_l$ including vector $\vec{U}$;
    iii) for each bore (34) of the carrier (20), mounting of a pivot (18) such that for each mounting the identified angular sectors $j_l$ and $i_q$ are superimposed.

5. The process according to claim 4, wherein the carrier (20) carries first coupling means and the pivots (18) carry second coupling means, arranged in sector $i_q$, said second coupling means comprising an opening (58), having a shape adapted to cooperate with said first coupling means.

6. The process according to claim 5, wherein the opening (58) is formed from a radial growth E carried by said pivot (18).

7. The process according to claim 6, wherein the first coupling means comprise a first projecting member (56) arranged in angular sector $j_l$, the first member being adapted to be arranged in k holes (62), each arranged around a bore (34) and in one of the angular sectors $j_1 \ldots j_l \ldots j_k$, and wherein step ii) further comprises the following step:
    inserting the first member (56) into the l-th hole (62) positioned in the angular sector $j_l$.

8. The process according to claim 7, wherein step iii) further comprises the following steps:
    orienting the pivot (18) so as to insert the first member (56) carried by the carrier (20) into the opening (58) of the radial growth E carried by the pivot (18).

9. The process according to claim 4, wherein n is greater than or equal to k and/or n and k are between 3 and 8, terminals included.

* * * * *